(12) United States Patent
Beams et al.

(10) Patent No.: US 8,706,348 B2
(45) Date of Patent: Apr. 22, 2014

(54) APPARATUS, SYSTEM AND METHOD UTILIZING APERIODIC NONRANDOM TRIGGERS FOR VEHICULAR TELEMATICS DATA QUERIES

(75) Inventors: Darren Beams, Oakville (CA); Neil Cawse, Oakville (CA)

(73) Assignee: Geotab, Oakville, Ontario (CA)

( * ) Notice: Subject to any disclaimer, the term of this patent is extended or adjusted under 35 U.S.C. 154(b) by 216 days.

(21) Appl. No.: 13/067,796

(22) Filed: Jun. 28, 2011

(65) Prior Publication Data

US 2012/0004804 A1    Jan. 5, 2012

Related U.S. Application Data

(63) Continuation-in-part of application No. 11/252,747, filed on Oct. 19, 2005, now Pat. No. 8,032,276.

(60) Provisional application No. 60/635,068, filed on Dec. 13, 2004.

(51) Int. Cl.
*G06F 19/00* (2011.01)
(52) U.S. Cl.
USPC ........................................ 701/32.7

(58) Field of Classification Search
USPC ................... 701/29.1, 32.2, 32.7; 342/457
See application file for complete search history.

(56) References Cited

U.S. PATENT DOCUMENTS

| | | | |
|---|---|---|---|
| 5,311,197 A | 5/1994 | Sorden et al. | |
| 6,636,790 B1 | 10/2003 | Lightner et al. | |
| 2004/0239488 A1* | 12/2004 | Douglass et al. | 340/426.11 |
| 2005/0065711 A1* | 3/2005 | Dahlgren et al. | 701/117 |
| 2007/0073450 A1* | 3/2007 | Ampunan et al. | 701/1 |
| 2011/0130916 A1* | 6/2011 | Mayer | 701/33 |
| 2011/0202305 A1* | 8/2011 | Willis et al. | 702/141 |
| 2011/0239789 A1* | 10/2011 | Takahashi et al. | 73/862.581 |
| 2012/0123632 A1* | 5/2012 | Nejah | 701/32.2 |
| 2012/0303203 A1* | 11/2012 | Olsen et al. | 701/29.1 |

* cited by examiner

*Primary Examiner* — Khoi Tran
*Assistant Examiner* — Robert Nguyen

(57) ABSTRACT

A vehicular telemetry apparatus, operable to initiate a telemetry processing operation in response to an aperiodic, nonrandom trigger signal cued by a sensed, operationally-variable vehicular condition. A trigger unit provides the trigger signal which in turn switches the telemetry apparatus from a resource-conserving idle state to a state in which a session is initiated, so that operationally salient variations in information on changes in vehicle sensor data are detected and processed.

31 Claims, 5 Drawing Sheets

APPARATUS, SYSTEM AND METHOD UTILIZING APERIODIC NONRANDOM TRIGGERS FOR VEHICULAR TELEMATICS DATA QUERIES

RELATED APPLICATIONS

This application is a continuation in part of U.S. patent application Ser. No. 11/252,747, filed Oct. 19, 2005 now U.S. Pat. No. 8,032,276, which in turn is based on Provisional Application Ser. No. 60/635,068 filed Dec. 13, 2004. Both of these related applications are hereby incorporated herein by reference and in their entirely.

FIELD OF THE INVENTION

The present invention relates to vehicular telemetry systems and methods, and especially to the use of triggers for autonomous control of querying, logging, and/or transmitting of vehicle-related data from an on-board vehicular telematics device.

BACKGROUND OF THE INVENTION

Vehicles have been known to exchange data with external systems such as vehicle management systems and diagnostic computer systems (for example, in a repair garage, in a regulatory enforcement or toll-collection facility, and the like) wirelessly using infrared data links, through low-power data links using transponders, and using communications protocols such as the IEEE 802.11 family of protocols and Bluetooth® protocols.

More sophisticated and longer range vehicular telemetry for commercial fleets has been made possible through other terrestrial and even satellite communications. In these vehicular telemetry systems, navigational (e.g., GPS) and other vehicle sensor data can be logged and/or transported over wireless data links to a remote host computer that is programmed to monitor and record salient vehicular (e.g., automotive) data and to support database systems for vehicular tracking and/or for maintenance, without the attendant need for a vehicle to be in a particular service bay, for example. Driver behavior can also be similarly monitored.

The California Air Resources Board ("CARB") has been at the forefront of establishing standards for monitoring vehicle emissions and influencing the development of electronic systems relating to same.

Early CARB requirements specified that all new vehicles sold in the United States in the state of California, beginning with the model year 1998, have some basic on-board diagnostics ("OBD") capability. These early requirements are now generally referred to as OBD-I, although this designation was not specifically employed until the subsequent introduction of what then came to be known as OBD-II. No standards for a data link connector or a data transfer protocol were established at that time, however.

In 1988, the Society of Automotive Engineers ("SAE") made recommendations concerning a standardized diagnostic connector and a set of diagnostic test or trouble code signals ("DTCs"). However, it was not until 1994 that CARB issued the OBD-II specification and mandated that it be adopted for all cars sold in California starting with model year 1996. The SAE-recommended DTCs and the standardized diagnostic connector were incorporated into this specification.

In 1996, the OBD-II specification was made mandatory by the US Environmental Protection Agency ("EPA") for all cars sold in the United States.

A subsequent CARB initiative, widely known as OBD-III, represented a third generation of on-board diagnostic requirements calling for an emissions regulatory agency to remotely retrieve diagnostic data from vehicles.

An emissions-centric OBD telemetry system (e.g., computer(s), microcontroller(s), and sensor(s)) generally monitors a vehicle's emission control systems to detect any malfunction or deterioration that causes emissions to exceed EPA-mandated thresholds.

More generally, OBD-II telemetry systems, such as vehicle-manufacturer augmented diagnostic systems, monitor a wide range of types of data that indicate the performance of the host vehicle. For example, these data can be analyzed not only to infer the vehicle's emission performance, but also to monitor vehicle speed, mileage, engine temperature, intake manifold pressure, and a host of other manufacturer-specific data queries, such as data relating to the vehicle's engine, transmission, brakes, alarm, and entertainment systems. In total, such telemetry systems typically access more than 300 segments of data relating to the performance of the vehicle, and also acquires data on the particular model or "make" of the vehicle.

Typical implementations in post-1996 North American vehicles, for example, provide data and control access to electronic control units ("ECUs") that control internal electromechanical actuators. Examples include ECUs that control fuel-injector pulses, spark-plug timing, and anti-lock braking systems. In many implementations, ECUs transmit status and diagnostic information over one or more shared standardized electronic communications buses associated with the vehicle in which the ECUs operate.

Such a bus arrangement effectively functions in an on-board computer network, bridging a variety of processors and sensors, each of which variously transmits and/or receives data. The primary computers in this network are the vehicle's electronic-control module ("ECM") and power-train-control module ("PCM"). The ECM typically accesses other computers and microcontrollers that monitor and/or control engine functions (e.g., cruise-control module, spark controller, exhaust/gas recirculation for internal combustion engines). The PCM typically controls and/or monitors ECUs associated with the vehicle's power train (e.g., engine, transmission, and braking systems). In fuel cell or battery-powered vehicles (e.g., hybrids or the like), the battery's state of charge or remaining potential may be important aspects of the monitoring and/or performance data carried over the bus.

When a vehicle is to be serviced, data from the standardized bus can be queried using external engine-diagnostic equipment that connects to a standardized 16-cavity electrical connector (called an OBD-II connector for vehicles made after 1996). More specifically, the OBD-II specification provides for a standardized hardware interface in the form of a female 16-pin (2×8) J1962 connector. Unlike its predecessor OBD-I connector, which was sometimes found under the hood of the vehicle, the OBD-II connector is required to be within 2 feet of the steering wheel, unless an exemption is granted to the vehicle manufacturer, in which case the connector still would be within reach of the driver's seat).

Data transferred through the OBD-II connector to engine-diagnostic equipment reflect the operational status of the vehicle and provides insights into whether specific components are functioning properly and/or how the vehicle is being driven. This in turn facilitates efficient and cost-effective vehicle servicing and/or maintenance planning and activity management. In particular, this lends telemetry systems to uses in vehicle tracking and other fleet asset management applications, although such systems also can be advantageously employed in driver-performance management applications too.

One consideration in the communication of vehicular data through telemetry is the harvesting of the desired information at the right instance to effectively represent vehicular activity that is germane to the management purpose of interest. U.S. Pat. No. 6,636,790 describes a telematics device in which data transmissions are either periodically sent or randomly sent, or are made responsive to an extrinsically motivated query through a remote (i.e., extra-vehicular) server or terminal. None of these three strategies strictly correlate contemporaneous vehicular circumstances with the act of data transmission, nor do these strategies correlate the vehicle's current state with querying or data logging activity.

At best, periodic transmissions are performed at predetermined intervals chosen as a compromise between sufficiently frequent transmissions, intended to provide an approximation of time insights into the real-world operation of the vehicle, and at the same time minimizing the costs involved in making data calls, which can provide diminishing "information-added" returns when performed too frequently.

Randomly instigated data transmissions generally are not associated with an attempt to control costs and do not focus on operational events. Randomness can lead to large gaps in the timeline of telematics coverage of the vehicle's operation. While randomness in sampling for statistical quality control methodologies is a useful technique for mitigating some forms of statistical prejudice, its usefulness in non-statistical situations, such as detecting a problematic event in the ongoing operation of a particular vehicle, is questionable.

Extrinsic (e.g. remote or extra-vehicular) telematic queries typically are motivated without insight into the vehicle's current state of operation. The timing of such queries may be "non-random" to the extent and in the particular sense that they might be purposely driven in accordance with some predetermined management rationale. Initiation of extrinsic telematic queries, nevertheless, are detached or unrelated to the vehicle's contemporaneous operating condition. In this sense, such queries may be considered to be random, as that term is used herein.

U.S. Pat. No. 5,311,197—issued May 10, 1994, describes a vehicular telematics arrangement which does not rely on periodic, random or extrinsic events to transact telemetry logging or transmissions. Instead, this patent discloses an arrangement in which accident conditions or other abnormal events trigger the telemetry transactions for location and vehicle operational data. However, this telematics triggering arrangement only captures exceptional circumstances—and hence does not cover the normal, (i.e. "abnormal, non-accident related") operations of the vehicle. Accordingly, both U.S. Pat. No. 5,311,197 and U.S. Pat. No. 6,636,790 fail to provide an efficient approach to telematics monitoring of a vehicle's normal operations.

SUMMARY OF THE INVENTION

In view of the deficiencies in conventional telematics devices, apparatus, methods and systems have been developed that couple a vehicle's current state of activity to the sampling (i.e., querying, acquiring or obtaining), logging, and/or transmission of telematics data. For example, the sampling, logging, and/or transmission may be activated in response to an operational state of one or more of the vehicle's functional units.

In commonly held co-pending U.S. Ser. No. 11/252,747, recording or transmitting positional vehicular data and events using a telematics apparatus involves a microprocessor which is programmed to compare new positional data from an input means to a previously recorded log of positional data. The apparatus creates a new log if the new positional data differs from the previously recorded log in accordance with predetermined parameters. New logs triggered by these comparisons are aperiodically and non-randomly rendered in response to sensed operationally variable vehicular data (i.e. data associated with a vehicles' position) differences exceeding a predetermined parameter. The result is an efficient rendering of vehicular telematics data transactions that are selectively predicated on operational-salience associated with sensed variability in the course of the vehicle's monitored operation.

In accordance with one aspect of the present invention, there is provided a vehicular telemetry apparatus operable to initiate a telemetry processing operation in response to an aperiodic, nonrandom trigger signal cued by a sensed, operationally-variable vehicular condition. The invention extends to a trigger unit that provides the trigger signal which in turn switches the telemetry apparatus from a resource-conserving idle state to a state in which a session is initiated, so that operationally salient variations in information on changes in vehicle sensor data (also referred to herein as sensed vehicular data) are detected and processed. Such an apparatus is useful, inter alia, in automatically and selectively displaying alerts for vehicle drivers or fleet managers as well as in logging, transmitting, and/or reporting operations, so that transactions involving redundant vehicular data can be reduced—or at least so that the transactions can correlate to vehicular activity rather than periodic or random passage of time.

Embodiments of the invention can provide for vehicular telemetric data processing to be aperiodically and non-randomly triggered. For example, telemetric data queries, log entries, other optional processing (e.g., diagnostic routines), and/or data transmissions are triggered by operationally-salient vehicle sensors, which provide sensed output signals that correspond to a change in an ongoing state of the vehicle's operation. That is, a variation in a sensor signal corresponding to change in an operating state of the vehicle provides an alternative to periodic or random data transmissions prevalent in conventional telemetric devices and methods.

In another embodiment, provision is made for machine-to-machine (sometimes referred to as M2M) telematics applications, in which telemetry data is collected from on-board a vehicle and processed, and the processed and/or unprocessed data is transmitted to a remote information processing machine for further processing of vehicular information obtained from the transmitted data.

In an embodiment of the present invention, triggering of queries, log entries, and/or data transmission events is designed to occur at a selected trigger threshold; in order to flag predetermined reportable circumstances arising out of the vehicle's concurrent operations. The resolution or granularity of the transmitted data can be tailored to circumstances particularly relevant to management attention and hence can justify the operational costs involved with obtaining and processing the telemetric data, such as infrastructure investments and bandwidth costs, costs relating to telematics and network processing capacity, and/or costs due to human monitoring). When a predetermined trigger threshold is exceeded, a selected vehicular-operation automatically commences acquisition, logging, and/or transmission of sensed vehicular data.

Aspects of the present invention are particularly applicable to terrestrial vehicles, in particular automotive vehicles, whether on-road or off-road. Moreover, aspects of the present invention may find application to, for example, internal combustion, hybrid, and electric-powered types of vehicles.

In combination with vehicles, apparatuses and methods according to embodiments of the present invention may be integrated with OEM (original equipment manufacturer) tools or installed as after-market additions.

According to another aspect of the present invention, methods and apparatus described herein are used in fleet management applications where management of a plurality of vehicles conventionally requires on-going human attention, with its attendant costs and monitoring infrastructure, as mentioned above. These embodiments include systems having display monitors and/or telecommunications links, which enable communicating and displaying information provided telemetrically.

Triggering in accordance with aspects of the present invention can be carried out using one or more of a variety of operationally salient vehicle sensor outputs. For example, sensed rpm or engine revolutions per minute data from a vehicle can be monitored. Sensed camshaft and/or crankshaft data may be used to similar effect. In another example, triggering may be responsive to sensed voltage levels and/or noise levels in the vehicles' electrical charging circuit.

More specifically, a vehicular charging system typically operates at an elevated (regulated generator or alternator driven battery charging) voltage. Voltage noise in a vehicle's power supply generally results from operation of the vehicle's charging system (e.g. alternator or generator), and the frequency of the noise is variable in relation to the engine operating conditions. Vehicle ignition detection and vehicle ignition proxy detection are useful in this relation.

In another example, ABS (anti-lock braking) sensed data, in which brake activation signals are sensed, are used. In yet another example, intake-manifold pressure-sensor output is used. Speed and/or directional sensors providing output representative of changes in speed and/or heading may be employed. In any case, the selection and adaptation of these and other sensed operating-condition outputs as well as changes and/or thresholds relating to same for sensing the dynamic variability in a vehicle's operation will be readily apparent to persons skilled in the art, in light of the descriptions herein.

In an embodiment of the present invention, sensed vehicular motion is used. In particular: sensed acceleration, and especially directly sensed acceleration by way of an inertial sensing device, is used. The wide sensitivity range of such a sensor generally lends itself to a correspondingly broad range of threshold settings suitable for application to characteristics of different types of drivers.

Aspects of the present invention may be employed with any combination of sensor outputs to provide aperiodic and nonrandom triggering cues, with the selection of sensors being determined based on their relevance to management of particular features of the vehicle's operation.

A transmission trigger according to an embodiment of the present invention can effect immediate data transmission, i.e., pass through concurrently accessed data, or release a collection of logged events. The advent of "always-on" wireless transmitter technologies particularly facilitates this embodiment. In such a case, the transmitter is in a continuously operationally enabled state, and the trigger passes the data through this already enabled physical channel.

The trigger may alternatively open up an on-going vehicular data transmission session (whether of logged data or not), following occurrence of the trigger, which continues until terminated by some limiting condition that then closes off that transmission session, e.g., by disabling the transmitter.

Alternatively, the transmission of logged data may be initiated in response to the accumulation of some predetermined quality or quantity of information content stored within the log.

BRIEF DESCRIPTION OF THE DRAWINGS

Aspects of the present invention may be understood by considering the detailed description provided below in conjunction with the attached drawings, of which.

DETAILED DESCRIPTION OF THE INVENTION

Figure 1:
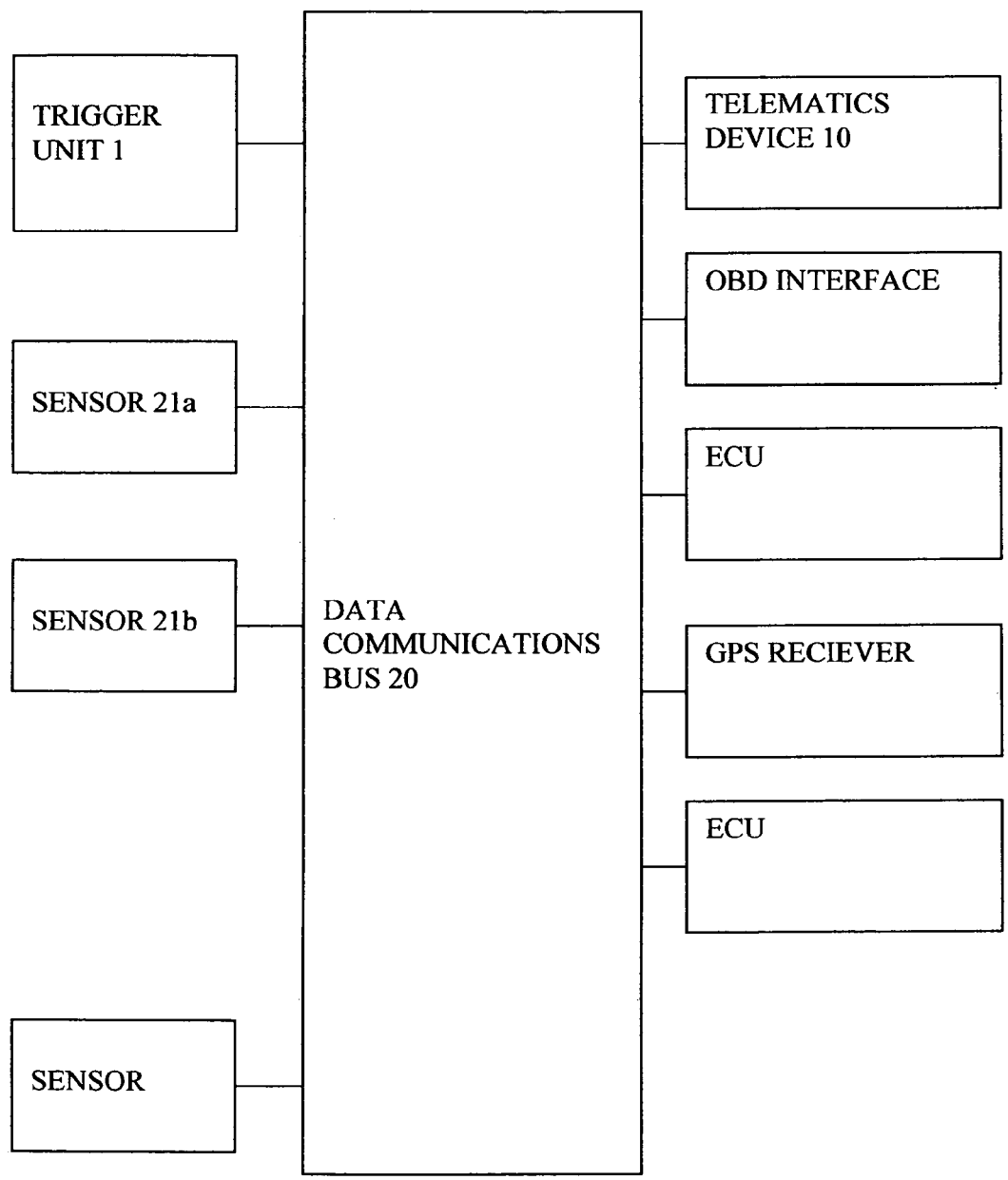
FIG. 1, is a functional block representation of a telematics apparatus according to an embodiment of the present invention.

Broadly speaking, aspects of the present invention as presented herein are concerned with on-board vehicular telematics devices or apparatuses, methods, and systems, wherein the vehicular telematics devices, methods and systems are operable to initiate a query; and/or initiate session for logging sensed vehicular data and/or a session for communicating or transmitting sensed vehicular data to a remote receiver in response an aperiodic, nonrandom trigger, which is cued or activated by a sensed, operationally-variable vehicular condition.

According to embodiments of the present invention, retrieval and processing of information take place via a data communications bus, including for example a vehicular data bus, which serves as a backbone of a vehicular communications network. In response to an aperiodic and nonrandom change in a sensed vehicular operating condition, which corresponds to a dynamic variability in an associated ongoing vehicular operation, an on-board vehicular telematics device automatically triggers a vehicle network data bus query. The sensed condition is considered nonrandom in the sense that there is a causal relation between the variation in the operation of the vehicle and the change that such variation produces in the sensed condition that results in triggering the telematics device.

In an embodiment, the above-described triggering operation functions as a low-threshold test and is embedded in an operational procedure that utilizes a high-threshold test to pre-enable the low-threshold test. (With reference to example embodiments of the high-threshold test, reference is made to commonly-held co-pending US patent application of even filing date and entitled Vehicular Telematics Device with Voltage Sensor-predicated GPS receiver activation, which is incorporated herein by reference in its entirety which provides for collateral powering up of a telematics device GPS receiver). This operational procedure is described in more detail below.

In another embodiment, a method for triggering vehicle network data bus queries entails using an on-board vehicular telematics device. The telematics device autonomously triggers a query in response to an aperiodic and nonrandom change in a sensed vehicular operating condition that corresponds to a dynamic variability in an associated vehicular operation.

In an embodiment of the present invention, a SAE J1979 compliant procedure is used. This standard defines a method for requesting various diagnostic data and a list of standard parameters that might be available from an ECU (engine control unit) of the vehicle. The parameters that are available are addressed by parameter identification numbers or PIDs, which are defined under the SAE J1979 standard. PIDs, their definitions, and formulae to convert raw OBD-II output to meaningful diagnostic references are known in the art. Manufacturers are not required to implement all PIDs listed in the SAE J1979 standard, and they are afforded latitude to include proprietary PIDs that are not listed. A PID request and data retrieval system gives access to real time performance data as well as flagged DTCs (data trouble codes). Individual manufacturers often enhance the OBD-II code set with additional proprietary DTCs.

In operation, each triggered vehicle network data bus query elicits query-specific response data on the vehicle's data bus, and the response data response is then conveyed via a serial data transfer to the on-board vehicular telematics device. Although preferred data bus signal protocols include: SAE J1850 PWM; SAE J1850 VPM; ISO 9141-2; ISO 14230; ISO 15765, the on-board vehicular telematics device may variously and advantageously process the signal to yield, for example, logic level representations of the data, which facilitates further on-board information processing, if desired.

The telematics devices and methods according to aspects of the present invention may optionally involve on-board diagnostics processing, either for local representation, for logging, and/or for transmission to a remote site. These features lend themselves in various ways to highly customizable processing paradigms, which in turn can be designed to tailor the telematics device for particular applications or uses.

Conveying vehicle operational data from a vehicle to a remote monitoring recipient involves, in no particular order, any combination of the following: establishing a data link between the vehicle and the remote monitoring recipient; collecting vehicle operation data from data sources in the vehicle; formatting the vehicle operation data according to a communications protocol; and conveying the formatted data over the data link.

Any physical communication channel may be used in the transfer of data through the data communications bus, whether generally, e.g. in relation to the vehicle's data bus itself, between the data bus and the vehicle's telematics device, or between the telematics device and any other part of an overall telematics system. It is sufficient that the response data resulting from a query appears on the data bus so that it can be subsequently processed by a microprocessor or other processing unit of the telematics device, as desired for the application of interest, and then logged and/or passed to a wireless transmitter can be wirelessly transmitted via a wireless communications system to an external receiver. Further processing of the transmitted data may then take place using an external computer or the like. For example, the wireless transmitter may be a stand-alone unit or may be part of a wireless transceiver. Also, for example, the data may undergo encoding, modulation, multiplexing, and/or other forms of signal processing before being transmitted.

Exemplary wireless communications systems that may be used for aspects of the present invention include cellular wireless systems, Bluetooth® systems, systems that adhere to the IEEE 802.11 family of wireless standards (e.g., the 802.11p WAVE system), and the like, short-range communications systems (e.g., 900 MHz systems), and satellite communications systems (e.g., the Iridium global communications network system).

For cellular systems, some such telephone systems divide their bandwidth between voice channels and sets of control channels. Each control channel set includes a Forward Control Channel (FOCC) and a Reverse Control Channel (RECC). The FOCC is used to send general information from a cellular base station to a cellular telephone. The RECC is used to send information from a cellular telephone to a cellular base station. The control channels are used to initiate a voice call. Once a voice phone call is initiated, the cellular system directs that call to a voice channel. After a cellular telephone has established service on a voice channel for a call, it never goes back to a control channel for the duration of that call. All subsequent information concerning hand-off of the call to another voice channel and termination of the call is handled via a voice channel. This leaves the control channels free to provide other services, such as telemetry, which is achieved by connecting a gateway to a port at a local mobile switching center (MSC) or regional facility. The gateway can process telemetry messages according to the specific needs of the application, and can provide either batch processing or real-time continuous processing of telemetric transactions.

One of the earliest services for sending data over a cellular communications network is known as cellular digital packet data (CDPD) service, which provided a way of passing Internet Protocol (IP) data packets via idle or unused radio channels. CDPD service typically was used for Advanced Mobile Phone System (AMPS) analog cellular telephone systems. Although CDPD service employs digital modulation and signal processing technology, the underlying services were still analog. Autonomous channel hopping techniques were used to search out idle channels between cellular voice calls. Packets of data were sent out in short bursts on these idle channels, although some cellular carriers had dedicated voice channels to meet high traffic demands of their subscribers. In operation, user data is packaged in accordance with IP standards, and the packets are broken up and transmitted via circuit-switched modems in a cellular telephone to digital radios and routers located at cell sites. CPDP service has been widely used for Internet information browsing, as well as for remote alarm monitoring applications.

Digital cellular telephone systems, such as Personal Communications Service or PCS systems, have largely replaced analog cellular telephone systems. These digital systems offer a variety of services, and typically combine voice, data, and control functions of a call on a single channel. CDMA (code division multiple access) and TDMA (time division multiple access) are commonly used signal multiplexing methodologies that facilitate multiple, overlapping uses of a single channel.

With 3G technologies, such as GPRS (General Packet Radio Service) technology, a cellular connection is always live when a 3G phone is turned on, so a user does not have to initiate a call to make an Internet connection.

Additional advances include: EDGE (Enhanced Data for Global Evolution) technology, UMTS (Universal Mobile Telecommunications System) technology, i-mode technology. Some of these technologies, as well as other technologies, are being developed for 4G cellular systems.

Wireless IP switches enable mobile operators to provide increasingly sophisticated data services in association with mobile environments, as is well known in the art. These switches seamlessly transport user traffic from a mobile data network onto a public data network such as the Internet.

According to an aspect of the present invention, a query is triggered by changes in a sensed vehicular operating condition, such that the condition deviates from a predetermined threshold value of change in the condition. Type and degree of change in a selected trigger is largely optional, and may be derived from any one or more of a variety of vehicle-associated sensors.

For example, a sensor that is sensitive to vehicle acceleration (inclusively meaning positive or negative (deceleration) "in-line" and/or in like manner lateral acceleration and/or rotational acceleration) can be employed to provide a suitable triggering signal. Note that, in this connection, sensors that are directly and immediately responsive to a change in condition, is generally preferred over sensors that receive input indirectly or receive computationally derived input that then are used as a basis for producing triggering signals.

For example, an embodiment of the present invention uses navigational sensor input in combination with input from other sensors. The navigational sensor input may be from on-board compasses, radio-frequency location-finding equipment, and a GNSS receiver. With a GNSS receiver, vehicle tracking applications are possible and can be extended to correlate with on-board diagnostics data in advantageous ways. Thus, a GNSS receiver can be employed not only to derive changes in acceleration but also to determine vehicle direction, vehicle speed, and vehicle location, among other things.

As is well know, GNSS stands for Global Navigation Satellite System and is used herein as a generic reference to include, for example, the Navstar GPS (a United States global positioning system) as well as other regional and national satellite navigation systems in use or under development, such as: Galileo (a global satellite system of the European Union and other partner countries); Beidou (a regional satellite system of the People's Republic of China; COMPASS (a global satellite system of the People's Republic of China); GLONASS (a global satellite system of Russia); IRNSS (a regional satellite system of India); and QZSS (a regional satellite system of Japan).

In such GNSS systems, taking GPS as a specific example a control segment uploads a navigation message to respective satellites in a space segment of the GPS constellation as a continuous 50 bits/second data stream modulated onto a carrier signal that is in turn broadcast by each of the satellites of the GPS constellation. A satellite message is transmitted as data packaged in logical units called frames, In the case of GPS, a frame is 1500 bits long, so takes 30 seconds to be transmitted. Every satellite in the GPS constellation begins to transmit a frame precisely on the minute and the half minute, according to its own clock, and each frame is divided into five subframes, each 300 bits long. The satellite message content is divided into two parts: an ephemeris and an almanac.

The highly accurate ephemeris and clock offset portion of the message content is packaged in subframes 1, 2, and 3, and their data content is the same for a given satellite for consecutive frames for periods lasting as long as two hours. New subframes 1, 2, and 3, and their corresponding new data sets, usually are transmitted precisely on the hour, with some exceptions.

The almanac portion of the message content includes subframes 4 and 5. These are subcommutated, meaning that consecutive subframes have different data content. 25 consecutive frames of subframes 4 and 5 data must be collected before a GPS receiver has all of the unique almanac data content being transmitted by the satellite message. As is well know, the almanac is descriptive of all of the satellites in the constellation as a whole, and is less accurate than the ephemeris, which provides data of a specific satellite.

Satellite uploads typically occur about once every 24 hours for each satellite. A terrestrial master control station (MCS) sends a satellite all of the data content the satellite will transmit during the next 24 hours, plus data for the next few weeks in case a subsequent upload is delayed for some reason. Each upload contains roughly 16 ephemeris data sets. The satellite transmits a given set based on its time of applicability. When the satellite begins transmitting a new data set to replace the older set previously transmitted, it is referred to as a cutover. The first cutover after an upload may occur at any time of the hour, but subsequent cutovers of new ephemeris data sets after the first cutover occur precisely on the hour. Each ephemeris data set is transmitted for no more than two hours. The ephemeris data sets include satellite clock offset time-of-applicability and ephemeris time-of-applicability information. These two time-of-applicability values are almost always the same, and for a cutover that begins on an hour epoch, the time-of-applicability values are almost exactly two hours later than the initial transmission time of the ephemeris data set.

A typical GPS receiver demodulates a satellite message it receives from a satellite, and continuously looks for any new ephemeris data sets. If the receiver detects a new ephemeris data set from a satellite, it will begin to use that data set in its navigational calculations. The receiver may also do something similar for new almanac data sets, but it is less critical to have the latest almanac data set so it may not collect every unique set, and usually an almanac data set is only collected from one of the satellites. An ephemeris data set is typically constituted to describe the clock and orbit of its corresponding satellite for a four-hour period, with the time-of-applicability near the center of that period. Because a data set is not transmitted for more than two hours, the time-of-applicability is almost always in the future, assuming the satellite is being tracked continuously. If a GPS receiver is turned off and then back on some time later, the receiver could use either its saved almanac data set or the latest ephemeris data set previously stored by the receiver, for re-acquiring a satellite broadcast signal. In terms of accuracy, the GPS receiver could use the previously acquired ephemeris data set if the current time is not more than two hours past the time-of-applicability, and it can reasonably begin navigating as soon as it can establish so-called "pseudo-range" measurements, and thus not wait for a new data set to be received. In practice it can be more accurate to use ephemeris data sets that are even several more hours past the time-of-applicability, than resorting to using the almanac data set.

Implicit from the foregoing discussion is that there is an imprecision in detecting and calculating acceleration, with attendant limitations on the sensitivity of using a GPS receiver for accelerometer purposes. Accordingly: in embodiments of the present invention a more directly responsive and sensitive sensor is used instead of GNSS data. With that in mind, embodiments of the present invention advantageously employ a purpose-specific accelerometer (sometimes referred to as an inertial momentum sensor or inertial accelerometer). With these embodiments, the sensed vehicular operating condition is an accelerometer-sensed change in vehicle speed or direction. The associated sensitivity of such an inertial accelerometer lends itself to advantageous precision and a timeliness of responsiveness that is not necessarily available from the aforementioned GNSS-based alternative. The dedicated inertial accelerometer is highly sensitive to changes in the vehicle's operation and, as such, offers a high degree of potential granularity or data resolution in triggering queries to the vehicular data bus.

In an embodiment of the present invention, tests for the absence of responses to pending queries are conducted. When there is an absence of a predetermined data response on the vehicular data bus, subsequent triggering of queries is prevented until the on-board vehicular telematics device ascertains that the vehicle is powered-up (and/or in motion). Suitable indicators of the vehicle's state of activity in this connection will readily occur to persons skilled in the art in light of the present disclosure.

Acceleration sensors and voltage based sensors are examples of the kinds of sensors that can be employed to satisfy such a high-level threshold test of vehicle operation, as a necessary prelude in some embodiments of the present invention, to enable the telematics device to subsequently carry out low-level triggering threshold tests for triggering vehicle bus queries. More specifically, in an embodiment, such high-level thresholding by the telematics device ascertains that the vehicle is powered up by sensing a vehicle power-supply voltage drop consistent with a solenoid or starter motor engagement, a battery-charging voltage level consistent with alternator operation, and/or that the vehicle is in motion by a position change or an accelerometer-sensed change in vehicle speed or direction. According to aspects of the present invention, an on-board vehicular telematics device includes a processor that:

queues queries to obtain vehicle performance data through a vehicular communications data bus; and
autonomously triggers an aperiodic and nonrandom change in a sensed vehicular operating condition corresponding to a dynamic variability in a vehicular operation, wherein the queries are triggered through the vehicular communications data bus.

An on-board vehicular telematics device according to an embodiment of the present invention may be integrated into one or more vehicular control modules connected to the vehicular communications bus, such as for example an ECU interface box or a breakout box, or a combination thereof.

An on-board vehicular telematics device according to another embodiment of the present invention may be configured to interface with a vehicular data interface port. For example, such an interface port may be an in-cabin vehicular data port, such as an OBD-11 connector in compliance with a J1962 standard.

In an embodiment of the present invention a telematics device includes a microprocessor for processing queries and vehicle performance data. The processing may be performed in accordance with an end-user determined paradigm or specification for selecting, sampling, and reporting such data. The paradigm may be pre-determined by hardwiring, by firmware, and/or by software implementations. Alternatively, the paradigm may be remotely and selectively imposed through use of a transceiver, as mentioned earlier.

The telematics device is operatively connected to at least one vehicular sensor adapted to sense a vehicular operating condition that deviates from a predetermined threshold value for change in the sensed operating condition. For example, the predetermined threshold may correspond to high-level threshold testing, as discussed above, in which the at least one sensor includes an accelerometer adapted to sense a change in vehicle speed or direction.

In an embodiment of the present invention, an on-board vehicular telematics device is responsive to an appearance of a predetermined signal on a vehicular communications data bus. In this embodiment, the signal is sent in response to a previously triggered query interrogation by the on-board vehicular telematics device, to enable the device to subsequently trigger a succeeding query.

According to another embodiment, an on-board vehicular telematics device is configured such that, absent a predetermined response on a vehicular communications data bus, query triggering is prevented until the on-board vehicular telematics device ascertains that the vehicle is powered-up and in motion. The ascertaining may be done via bus-independent connections to vehicle sensors. More particularly, such a telematics device ascertains that the vehicle is powered up through a vehicle sensor sensing a voltage drop in the vehicle's power supply, which is consistent with (and generally distinctive of) engagement of a solenoid and a starter motor, and/or by determining that the vehicle is in motion through sensing a change in vehicle speed or direction, such as through use of an accelerometer sensor.

According to an embodiment, autonomous triggering by the telematics device is responsive to a predetermined degree of ongoing change in a sensed vehicular operating condition, to trigger the queued queries through the vehicular communications data bus. By way of example, such a change may be a sensed change from a predetermined value for the condition, or a sensed change from a last sensed value for the condition.

Moreover, a further embodiment of a telematics device may allow for adjustment to select and/or adjust a predetermined sensor type and/or a predetermined degree of change, whereby the device is responsive to an adjusted degree of change. The adjustment maybe performed on-board the vehicle or, alternatively, may be performed remotely. Selection of sensor type and/or adjustment of degree of change can be employed to alter the granularity or resolution of representative data points, so that the device can adapt to circumstances where greater or lesser degrees of change are appropriate. From the perspective of a remote base station receiving telematics data from such a telematics device, the type and threshold adjustments can offer data perspectives analogous to a zoom control, in a sense filtering and magnifying or focusing the sensed vehicle operational data.

Figure 2:
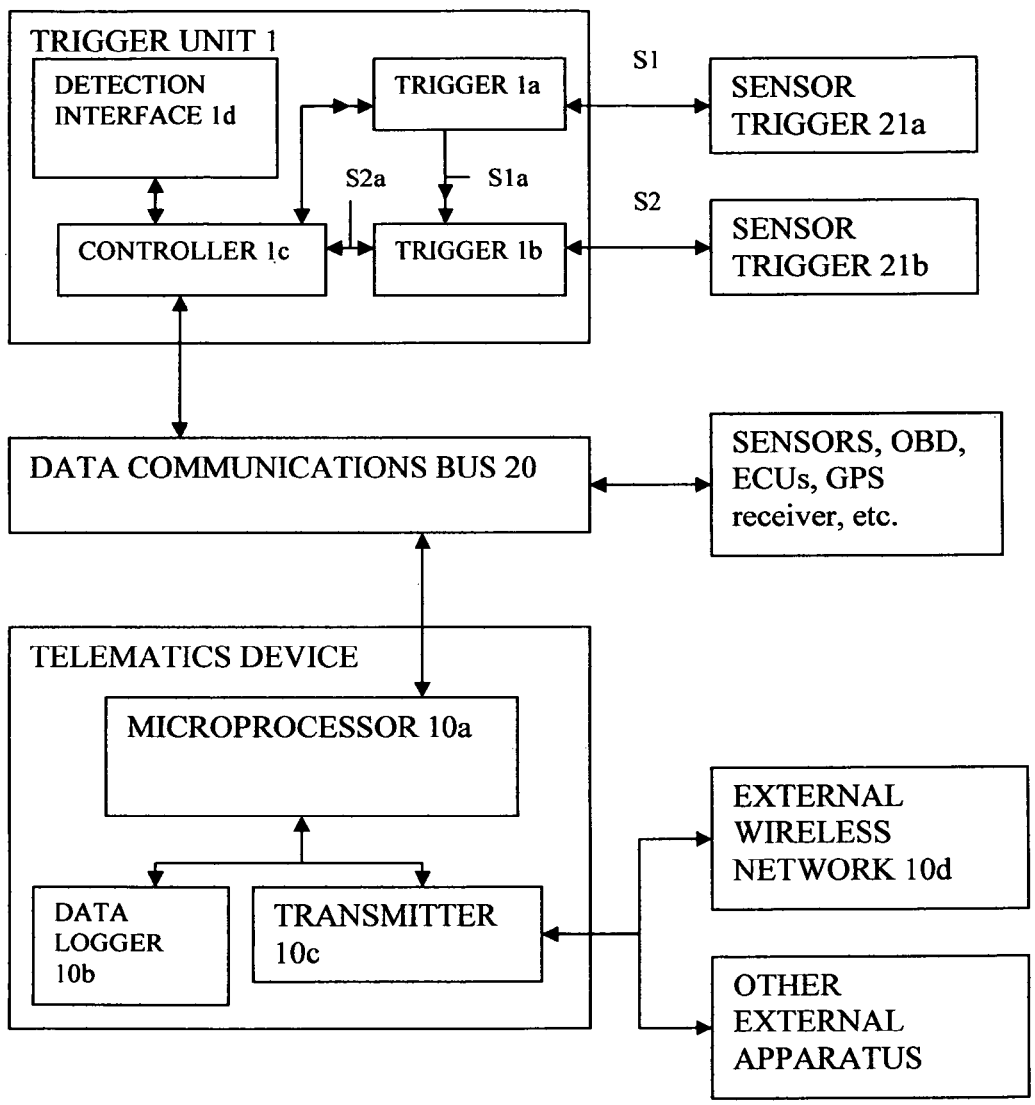
FIG. 2 is a functional block representation of a telematics system according to an embodiment of the present invention.

Referring now in particular to FIGS. 1 and 2 of the drawings, there are block diagrams that schematically show operational units of a vehicular telematics apparatus according to an embodiment of the present invention, as well as procedures performed by the apparatus. The apparatus is installed in a vehicle (not shown), such as a car, a truck, and the like.

As shown there is provided a trigger unit 1 that operates in association with a telematics device 10. The trigger unit 1 includes at least first and second triggers 1a and 1b arranged in a hierarchical relationship in which the first trigger 1a enables the second trigger 1b. For example, the trigger unit 1 may be a signal detection system in which signal detectors, such as those known in the art, are arranged to detect a presence or an absence of particular signals.

The first trigger 1a is sensitive to a predetermined change in an output signal S1 from a first vehicular operating sensor 21a. The output signal S1 represents a first dynamically-variable vehicular operating condition. The first trigger 1a is operable or activated when the predetermined change in the output signal S1 is detected, which then causes the first trigger 1a to send a signal S1a to enable the second trigger 1b.

The second trigger 1b is, in turn, sensitive to a predetermined change in an output signal S2 from a second vehicular operation sensor 21b. The output signal S2 represents a second dynamically-variable vehicular condition. The second trigger 1b is operable or activated when the predetermined change in the output signal S2 is detected, which then causes the second trigger 1b to send an activation signal S2a to the telematics device 10.

The signal S2a may be sent directly from the second trigger 1b to the telematics device 10, or from a controller 1c of the trigger unit 1 to the telematics device 10. Optionally, the signal S2a may be sent to the telematics device 10 via a data communications bus 20 of the vehicle.

The signals S1 and S2 may be sent directly from the sensors 21a and 21b to the first and second triggers 1a and 1b, respectively, or may be sent via the vehicular data communications bus 20.

In response to receiving the activation signal S2a from the trigger unit 1, the telematics device 10 commences querying operations by communicating with one or more other vehicular devices via the vehicular data communications bus 20. The querying operations including activating a data logger 10b to perform data logging operations and activating a data transmitter 10c to perform data transmission operations. The data logging and the data transmission correspond to data obtained from on-board the vehicle, such as data from one or more sensors installed in the vehicle, as well as data from a GPS receiver installed in the vehicle. The data may include diagnostic data related to the performance of the vehicle or a state of one or more components of the vehicle, and also may include data that can be used to assess driver performance, such as vehicle speed, braking characteristics, use of directional signals, and the like. A microprocessor 10a of the telematics device 10 serves as a controller that controls the data logger 10b and the data transmitter 10c, and also functions to encode and/or format data prior to transmission, if encoding and/or formatting are needed.

Optionally, the first trigger 1a may be responsive to a plurality of primary dynamically variable, vehicular operating conditions. That is, the first trigger 1a may be sensitive to a predetermined change in an output signal from each of a plurality of vehicular operating sensors. For example, in one application, the first trigger 1a enables the second trigger 1b in response to a combination of predetermined changes in all of the plurality of vehicular operating sensors. Alternatively, it another example application, the first trigger 1a enables the second trigger 1b in response to any one predetermined response from any one of the plurality of vehicular operating sensors.

For example, the sensors providing output to the first trigger 1a may include a vehicle motion sensor, such as an accelerometer, and also may include a vehicle power-supply charging-voltage sensor. As discussed earlier, the accelerometer may be an inertial mass sensor.

In an embodiment of the present invention, the first trigger 1a is responsive to a primary signal from a vehicular motion sensor, such as an accelerometer, and the second trigger 1b also is responsive to a secondary signal from a vehicular motion sensor, such as an accelerometer.

Note that in this embodiment, predetermined changes corresponding to the first and second triggers 1a and 1b are both changes in acceleration. In such an arrangement, the predetermined change required to activate the first trigger 1a is different from the predetermined change required to activate the second trigger 1b. For example, the change required for the first trigger 1a is greater than the change required for the second trigger 1b. This form of hierarchical thresholding helps to avoid incidental triggering due to unintentional movement of the vehicle due to factors unrelated to operation of the vehicle, such as, for example, a buffeting wind, movement of an occupant that might result in movement of the vehicle that is not in fact operating.

In another embodiment, one of the first and second triggers 1a and 1b may be activated in response to a predetermined change in a vehicular charging voltage level, and the other of the first and second triggers 1a and 1b may be activated in response to a predetermined change in acceleration.

For example, the predetermined change in acceleration may be a change of about 360 mG (microgravities) or greater, and the predetermined change in the charging voltage level may be a change of about 0.5 volts or more above a nominal battery output voltage.

In use, the trigger unit 1 described above is employed in combination with an associated telematics device 10, and this combination is in communication with a vehicular data communications bus 20, which is arranged in networked relation with one or more vehicular sensors and/or control units (shown generally at 20a) in a vehicle, (not illustrated).

Note that, as illustrated in FIG. 1, the trigger unit 1 (i.e., its operational components 1a, 1b, 1c, and 1d, the latter two discussed below) are illustrated as distinct from the microprocessor 10a, the sensors 21, and the bus 20. In alternative embodiments, the trigger may be incorporated into any of the microprocessor 10a, the sensors 21, or the bus 20.

The microprocessor 10a of the telematics device 10 is operable to run programmed queries to communicate with predetermined vehicular sensors and/or control units through the communications bus 20. The trigger unit 1 cooperates with the telematics device 10 in this respect to selectively trigger these queries through the communications bus 20 by way of the operation of the first and second triggers 1a and 1b. For example, the telematics device 10 is operable to run programmed queries to communicate with an automotive engine control unit of the vehicle (not shown).

In an embodiment of the present invention, the trigger 1 further includes a detection interface 1d for receiving and detecting query responses through the communications bus 20. In such an arrangement, the second trigger 1b is adapted to serially trigger queued queries from the microprocessor 10a to the communications bus 20 in response to predetermined changes in the output signal S2 from the second vehicular operation sensor 21b, but to do so only until the detection interface 1d of the trigger unit 1 detects a predetermined response failure condition.

There are any number of reasons why response traffic on the communications bus 20 can lapse and lead to the detection of a failure condition. For example, one reason is that the engine (not shown) has been shut down and the vehicle is no longer in operation. Accordingly, detection of the failure condition disables the second trigger 1b, and the trigger unit 1 reverts to the first trigger 1a to re-enable the second trigger 1b subject to the predetermined change in the output signal S1 from the first vehicular operating sensor. Thus, if the engine has been turned off and the vehicle is at rest, then telematics queries are discontinued until such time as the vehicle is restarted and the first and second trigger conditions are satisfied.

In a further embodiment, a trigger control unit is used to manage aperiodic and nonrandom triggering of the telematics device 10. The trigger control unit 1c is operable:

to establish a post-triggering interval in response to a query triggering event (i.e., an aperiodic and nonrandom change in a sensed vehicular operating condition);

to forestall subsequent aperiodic and nonrandom triggering of queries (e.g., by subsequent aperiodic and nonrandom changes in a sensed vehicular operating condition) until the post-triggering interval lapses; and thereafter to initiate a subsequent triggering by a succeeding aperiodic and nonrandom triggering event.

Such post-triggering intervals may be variously driven. For example, in a counter-based interval-driven embodiment, a counter accumulates a threshold number of instances of sensed aperiodic and nonrandom triggering events before actually triggering a query.

Alternatively, in another interval-driven embodiment, a precedent aperiodic and nonrandom event may trigger a query, and with it an associated interval during which any succeeding aperiodic and nonrandom triggering events are ignored and hence do not trigger additional queries. The interval may be of a predetermined duration following a collateral (precedent) triggering of such a query, or it may be the remainder of some otherwise initiated but ongoing interval during which the precedent aperiodic and nonrandom triggering event in question triggered the query. In either case, once the interval has lapsed, succeeding aperiodic and nonrandom triggering events can enable corresponding succeeding queries. With this exemplary embodiment, intervening aperiodic and nonrandom triggering events (e.g., any such events arising between when the post-triggering event is established until it lapses) are ignored during the interval. This facilitates management of bandwidth demands that are imposed on the communications bus 20.

Other failure condition detection methods will readily occur to persons skilled in the art in light of the present disclosure. For example, one such method involves detection of a lapse of a predetermined time following the last-detected response from the communications bus 20. Another such method involves detection of a predetermined number of unanswered queries to the communication bus 20.

FIG. 2 of the drawings depicts a more detailed representation of the relationships generally illustrated in FIG. 1, and in further detailing trigger unit and provision for data logging and transmitting functions, illustrating in particular the electrical communications relationship between microprocessor and data logger and transmitter, with the latter being adapted to communicate variously with an external wireless network, or other external vehicle data processing apparatus (e.g. a vehicle diagnostic device such as those generally used in automotive service centers).

Figure 3:
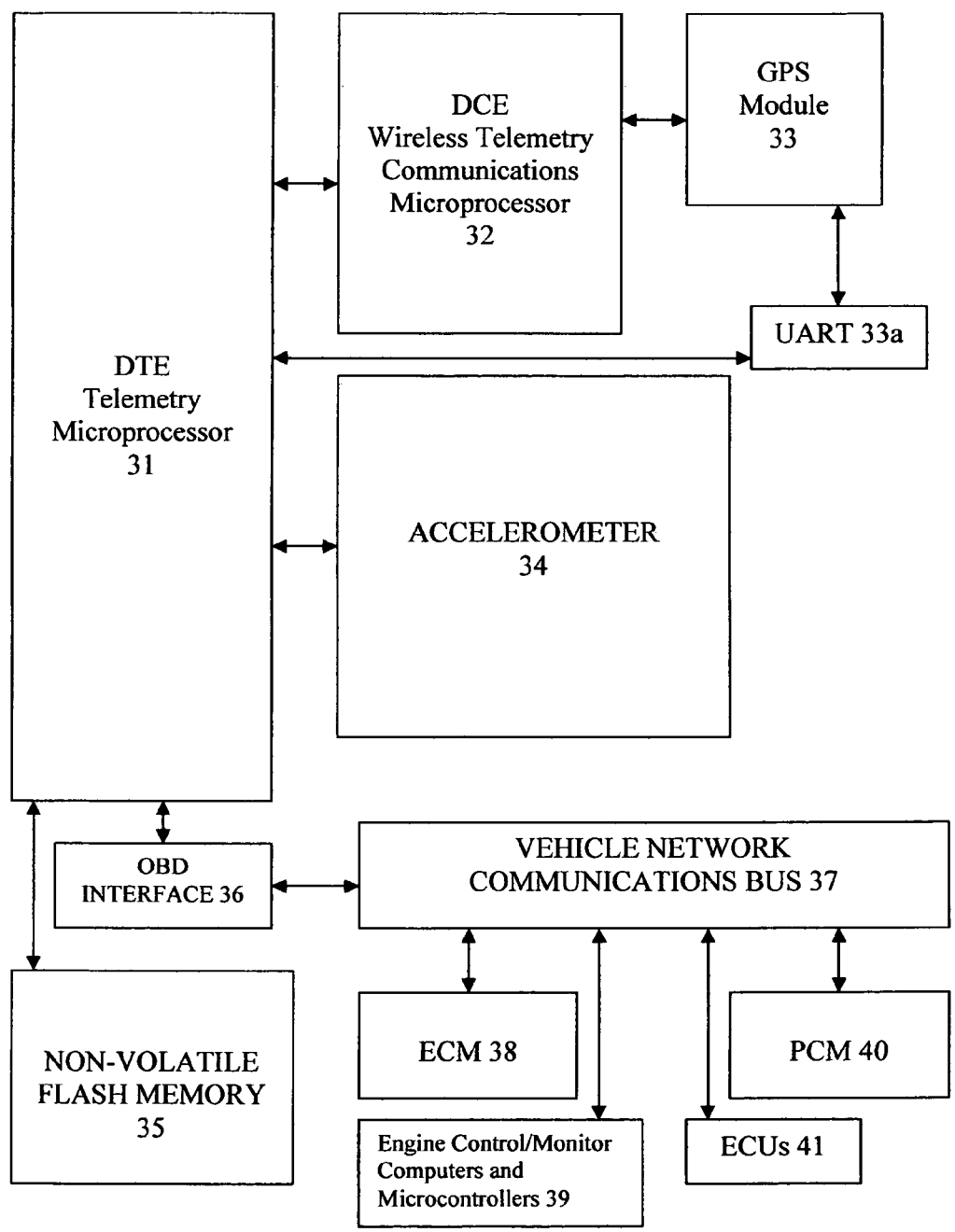
FIG. 3 is a functional block representation of a particular functional arrangement of components according to an embodiment of the present invention.

Referring now to FIG. 3 of the drawings, there is illustrated an on-board vehicular telemetry system, including a telematics device comprising a DTE (data terminal equipment) telemetry microprocessor 31 incorporating an integral functionally-implemented trigger unit; a DCE (data communications equipment) wireless telemetry communications microprocessor 32; a GPS module 33; an accelerometer 34; a non-volatile flash memory 35 and provision for an OBD interface 36 with a vehicle network communications bus 37. Bus 36 is in turn electrically linked in communicating relation with an associated vehicle's ECM 38 and PCM 40, and their respective variously associated engine control/monitor computers and microcontrollers 39 and ECU's 41.

Microprocessor 31 is interconnected with microprocessor 32 (such as a Leon 100 module available from ublox), using a RS-232 serial interface. Microprocessor 32 is interconnected with GPS module 33 (such as Neo-5 ROM-based GPS receiver module also available from ublox), using for example an I$^2$C compatible display data channel (DDC) serial communications interface.

Figure 4:
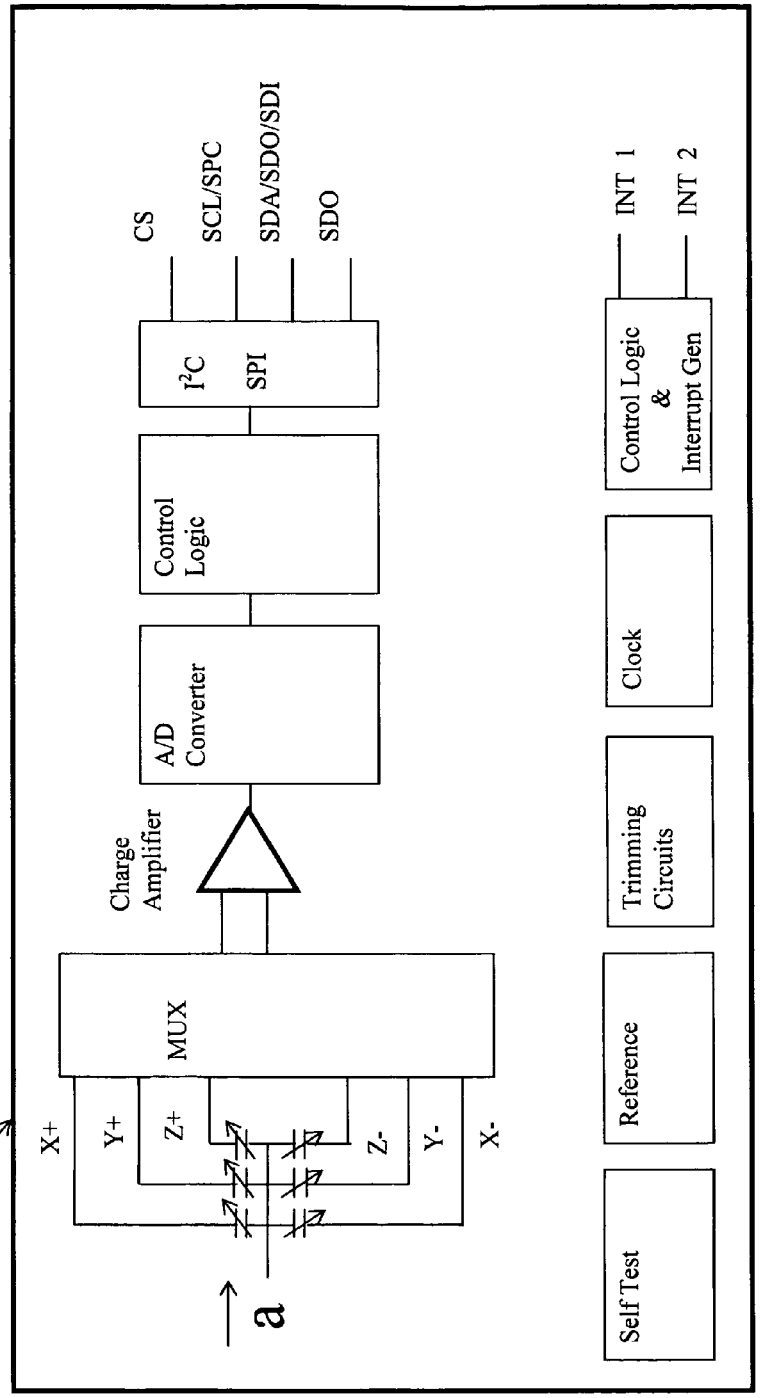
FIG. 4 is a functional block diagram illustrating an accelerometer component useful in accordance with the present invention; and, FIG. 5 of the drawings is a flow chart illustrating the method of operation of the present invention in relation to the various components referenced in FIG. 2.

FIG. 4 of the drawings depicts a functional block diagram of accelerometer 34, shown in FIG. 3. In this embodiment, accelerometer 34 is a linear MEMS accelerometer provided in an LGA package and is an ultra compact low-power three axes linear accelerometer that includes a sensing element and an IC interface able to take the information from the sensing element and to provide the measured acceleration to the external world through I$^2$C/SPI serial interface. This device is commercially from ST, as model LIS302DL and has a user-selectable full scale of ±2 g and ±8 g and is capable of measuring accelerations with an output data rate of 100 Hz or 400 Hz. This device is a surface micro-machined accelerometer which employs suspended silicon structures that are attached to the substrate at a few points called anchors and are free to move in the direction of the sensed acceleration. When acceleration is applied to the sensor the proof mass displaces from its nominal position, causing an imbalance in the capacitive half-bridge. This imbalance is measured using charge integration in response to a voltage pulse applied to the sense capacitor. At steady state the nominal value of the capacitors are few pico Farad and when acceleration is applied the maximum variation of the capacitive load is of few femto Farad. The complete measurement chain is composed by a low-noise capacitive amplifier which converts into an analog voltage the capacitive unbalancing of the MEMS sensor and by and by analog-to-digital converters. The acceleration data may be accessed through an I$^2$C/SPI interface thus making the device particularly suitable for direct interfacing with an application microcontroller. Data synchronization in digital system employing the device is made simpler through the usage of the Data-Ready signal (RDY) which indicates when a new set of measured acceleration data is available thus simplifying data synchronization in digital system employing the device itself.

Figure 5:
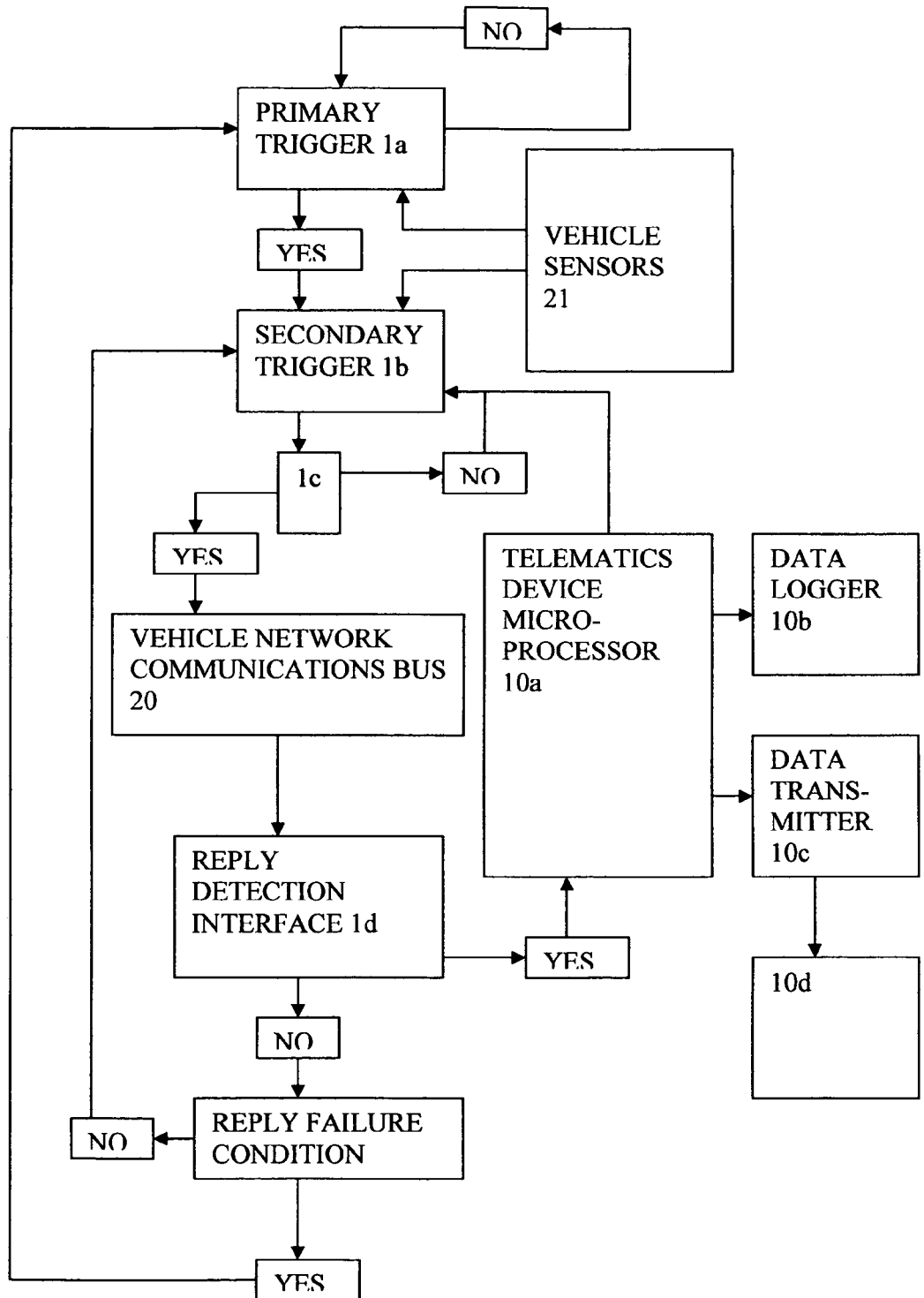

FIG. 5 of the drawings is a flow chart illustrating the method of operation of the present invention in relation to the various components referenced in FIG. 2.

The various embodiments of the present invention described above have been presented by way of example and not limitation. It will be apparent to persons skilled in the relevant art(s) that various changes in form and detail can be made therein without departing from the spirit and scope of the present invention. Thus, the present invention should not be limited by any of the above-described example embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

The invention claimed is:

1. A vehicular telemetric method, comprising:
    receiving an aperiodic and nonrandom trigger signal autonomously produced when a sensed operationally-variable vehicular condition exceeds a pre-set threshold condition,
    activating a data logging device to log sensed vehicle data,
    activating a data transmitter to communicate the sensed vehicle data to a remote receiver, and issuing queries to vehicle sensors to obtain the sensed vehicle data, the queries being communicated from a microprocessor via a vehicular communications bus to the vehicle sensors, and receiving responses to the queries via the vehicular communications bus and wherein the trigger signal is issued in response to a first sensor sensing a first operationally-variable vehicular condition that exceeds a first pre-set threshold condition and a second sensor sensing a second operationally-variable vehicular condition that exceeds a second pre-set threshold condition, the second sensor is activated for sensing after the first pre-set threshold condition of the first sensor is exceeded, and the trigger unit issues the trigger signal after the second sensor is activated and after the second pre-set threshold condition of the second sensor is exceeded.

2. The vehicular telemetric method according to claim 1, wherein the microprocessor, the data logging device, and the data transmitter are incorporated in d telematics apparatus on-board a vehicle.

3. The vehicular telemetric method according to claim 1, wherein the microprocessor issues a subsequent query in a queue based on a response to a previous query in the queue.

4. The vehicular telemetric method according to claim 1, further comprising:

establishing a data link between the data transmitter and the remote receiver;

issuing queued queries and collecting responses to the queries via the vehicular communications bus, the responses corresponding to vehicle operation data;

packaging the vehicle operation data according to a communications protocol; and wirelessly conveying the packaged data over the data link to the remote receiver.

5. The vehicular telemetric method according to claim 1, wherein the sensed operationally-variable vehicular condition is an accelerometer-sensed change at least one of: vehicle speed and vehicle direction.

6. The vehicular telemetric method according to claim 1, wherein the sensed operationally-variable vehicular condition is a sensed change in voltage of a vehicular power supply.

7. A vehicular telemetric method, comprising:

receiving an aperiodic and nonrandom trigger signal autonomously produced when a sensed operationally-variable vehicular condition exceeds a pre-set threshold condition, activating a data logging device to log sensed vehicle data, activating a data transmitter to communicate the sensed vehicle data to a remote receiver, and issuing queries to vehicle sensors to obtain the sensed vehicle data, the queries being communicated from a microprocessor via a vehicular communications bus to the vehicle sensors, and receiving responses to the queries via the vehicular communications bus and wherein the trigger signal is issued in response to a first sensor sensing a first operationally-variable vehicular condition that exceeds a first pre-set threshold condition and a second sensor sensing a second operationally-variable vehicular condition that exceeds a second pre-set threshold condition, and wherein the first sensor is an accelerometer, and the first operationally-variable vehicular condition is vehicle movement, and wherein the second sensor is an ignition proxy detector, and the second operationally-variable vehicular condition is a vehicular power status, and wherein the trigger signal is issued when a determination is made that the vehicle movement exceeds a predetermined amount, and the vehicle power is on.

8. A vehicular telematics apparatus comprising:

a trigger unit; and, any one or more of:

a data logging device operable to log sensed vehicle data, wherein said data logging device initiates a data logging session in response to a trigger signal issued from the trigger unit in response to a trigger sensor sensing an aperiodic and nonrandom operationally-variable vehicular condition within a normal operational range for such a condition;

a vehicle data transmitter operable to communicate sensed vehicle data to a remote receiver, wherein said vehicle data transmitter initiates a wireless data communication session with said remote receiver in response to a trigger signal issued from the trigger unit in response to a trigger sensor sensing an aperiodic and nonrandom trigger operationally-variable vehicular condition within a normal operational range for such a condition;

a vehicle data query controller operable to conditionally collect data though a vehicular data communications bus, for vehicle data originating from other vehicular data sensors, wherein said data query controller initiates data collection as a conditional response to a contemporaneous trigger signal issued from the trigger unit in response to a trigger sensor sensing an aperiodic and nonrandom operationally-variable vehicular condition within a normal operational range for such a condition, and wherein the trigger unit issues the trigger signal in response to a first sensor sensing a first operationally-variable vehicular condition that exceeds a first pre-set threshold condition and a second sensor sensing a second operationally-variable vehicular condition that exceeds a second pre-set threshold condition and wherein the first sensor is an accelerometer, the first operationally-variable vehicular condition is an acceleration of the vehicle, and the first pre-set threshold condition is a change in the acceleration of the vehicle exceeding a first amount, and wherein the second sensor is an accelerometer, the second operationally variable vehicular condition is a change in the acceleration of the vehicle exceeding a second amount, and wherein the first amount is different form the second amount.

9. An on-board vehicular telematics apparatus according to claim 8.

10. The vehicular telematics apparatus according to claim 8 wherein the vehicle data is any combination of vehicle performance data; vehicle location data; vehicle condition data, and driver performance data.

11. The vehicular telematics apparatus according to claim 8 wherein the trigger signal issued from the trigger unit is in response to the trigger sensor sensing an aperiodic and nonrandom quantitative or qualitative change in operationally-variable vehicular condition within said normal operational range for such a condition.

12. The vehicular telematics apparatus according to claim 8 wherein the trigger signal issued from the trigger unit is in response to the trigger sensor sensing an aperiodic and non-random operationally-variable vehicular condition within said normal operational range for such a condition but which is at variance from a pre-set threshold condition within said normal operational range.

13. The vehicular telematics apparatus according to claim 8, wherein said trigger unit and said vehicle data query controller are functionally integrated into a vehicular telematics apparatus microprocessor.

14. The vehicular telematics apparatus according to claim 8, wherein respective ones of said data logging device initiating a data logging session; said vehicle data transmitter initiating a wireless data communication session with said remote receiver; and, said data query controller initiating data collection; are each in corresponding direct or indirect response to said trigger signal.

15. The vehicular telematics apparatus according to claim 8, wherein the trigger sensor is a vehicular movement sensor.

16. The vehicular telematics apparatus according to claim 8, wherein the accelerometer is an inertial mass sensor that detects a change in vehicle speed and change in vehicle direction.

17. The vehicular telematics apparatus according to claim 8, comprising a microprocessor programmed to issue queries to vehicle components for obtaining vehicle performance data and wherein the queries are communicated via a data communications bus, and responses to the queries are communicated from the vehicular components to the microprocessor via the data communications bus.

18. The apparatus according to claim 8 wherein one of the first and second sensors includes an ignition detector.

19. The apparatus according to claim 8 wherein
the first sensor is one of an ignition detector or an accelerometer
the second sensor is an accelerometer,
the second sensor is activated for sensing after the first pre-set threshold condition of the first sensor is exceeded, and
the trigger unit issues the trigger signal after the second sensor is activated and after the second pre-set threshold condition of the second sensor is exceeded.

20. The apparatus according to claim 8, wherein
the second sensor is activated for sensing after the first after the first pre-set threshold condition of the first sensor is exceeded and
the trigger unit issues the trigger signal after the second sensor is activated and after the second pre-set threshold condition of the second sensor is exceeded.

21. The vehicular telematics apparatus according to claim 11, wherein the aperiodic and nonrandom change is a degree of change or a rate of change in said operationally-variable vehicular condition within said normal operational range for such a condition.

22. The vehicular telematics apparatus according to claim 12, wherein the trigger unit autonomously issues the trigger signal,
in response to a trigger sensor sensing an operationally-variable vehicular condition that exceeds said pre-set threshold condition within said normal operational range, and
when said pre-set threshold is exceeded.

23. The vehicular telematics apparatus according to claim 14, wherein said data query controller initiates collection by initiating a request for such data on said vehicular data communications bus.

24. The vehicular telematics apparatus according to claim 23, wherein vehicle data responses to the triggered data query controller request are directed by a vehicular telematics apparatus microprocessor from said vehicular data communications bus to said logger and/or said transmitter, which are respectively thereby indirectly responsive to said trigger signal to log/transmit vehicle data from the vehicle data response.

25. The vehicular telematics apparatus according to claim 15, wherein the vehicular movement sensor includes at least one of: an accelerometer and a geomagnetic field detector.

26. The vehicular telematics apparatus according to claim 17, wherein said data communications bus is a vehicular network communications bus.

27. The vehicular telematics apparatus according to claim 26 further comprising an electrical connector for connecting to the vehicular data communications bus.

28. The vehicular telematics apparatus according to claim 26, wherein the electrical connector includes any combination to:
an interface to an electronic control unit (ECU) interface box;
an interface break-out box, and
an interface to a vehicular data port.

29. The vehicular telematics apparatus according to claim 28 wherein the interface to a vehicular data port is OBD-II compliant.

30. The apparatus according to claim 18 wherein the ignition detector is an ignition proxy detector.

31. The apparatus according to claim 30 wherein the ignition proxy detector includes at least one of:
an engine revolutions detector;
a vehicle speed detector;
a communications-bus high-voltage-state detector;
a vehicle-power-supply voltage-drop detector;
an intake-manifold pressure detector;
a vehicle-power-supply voltage-noise detector;
and a charging-system voltage detector.

* * * * *